United States Patent [19]

Whiteside

[11] Patent Number: 4,632,542
[45] Date of Patent: Dec. 30, 1986

[54] EXPOSURE CONTROL SYSTEM HAVING DUAL MODE PHOTODETECTOR

[75] Inventor: George D. Whiteside, Lexington, Mass.

[73] Assignee: Polaroid Corporation, Cambridge, Mass.

[21] Appl. No.: 729,989

[22] Filed: May 2, 1985

[51] Int. Cl.$^4$ ............................................. G03B 7/099
[52] U.S. Cl. .................................................... 354/481
[58] Field of Search ............................. 354/419, 481

[56] References Cited

U.S. PATENT DOCUMENTS

| | | | |
|---|---|---|---|
| Re. 31,219 | 4/1983 | Shenk | 354/195 |
| 3,511,142 | 5/1970 | Biber | 354/481 |
| 3,855,601 | 12/1974 | Uchiyama et al. | 354/419 |
| 3,942,183 | 3/1976 | Whiteside | 354/29 |
| 4,064,519 | 12/1977 | Kee | 354/141 |
| 4,122,466 | 10/1978 | Iwata | 354/481 |
| 4,173,400 | 11/1979 | Faramarzpour | 354/27 |
| 4,192,587 | 3/1980 | Larocque et al. | 354/27 |
| 4,199,246 | 4/1980 | Muggli | 354/195 |
| 4,477,172 | 10/1984 | Yokota | 354/480 |

Primary Examiner—Russell E. Adams
Attorney, Agent, or Firm—John J. Kelleher

[57] ABSTRACT

An exposure control system for a photographic camera of the type employing a scanning type shutter, a controllable source of artificial illumination and a photodetector for sensing scene brightness levels both prior to and during film exposure preferably includes a light diffuser that is automatically movable, in response to a selected camera function, between a first position where it can collect scene radiation from a field of view substantially greater than that of the photodetector and then direct the collected radiation along an optical path onto the light sensitive surface of the photodetector, and a second position displaced from the photodetector where the diffuser has no effect on the amount of scene light measured by the photodetector. Scene brightness level is normally measured before actual film exposure in order to determine the amount of artificial illumination that must subsequently be added to the scene during film exposure and is measured during film exposure to control the extent of shutter blade opening for proper film exposure. By increasing the effective size of the viewing angle over which scene brightness level is measured prior to exposure, the photodetector is precluded from classifying an otherwise low light level scene as a high light level scene if a relatively bright, but localized light source should be present in the scene to be photographed, thereby avoiding the possibility of an underexposed photographic image being caused by such a localized light source.

4 Claims, 7 Drawing Figures

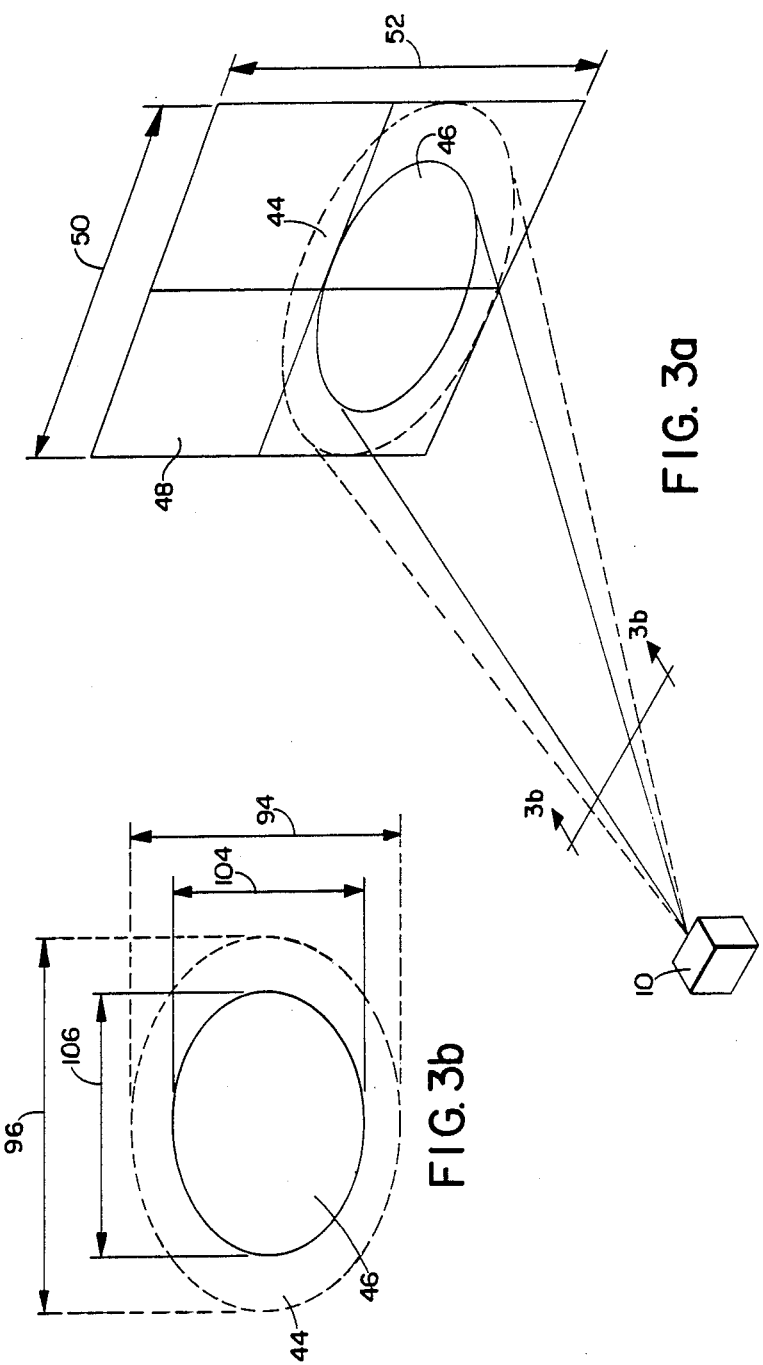

EXPOSURE CONTROL SYSTEM HAVING DUAL MODE PHOTODETECTOR

BACKGROUND OF THE INVENTION

The present invention relates to a photographic camera that includes an exposure control system having scene light detection apparatus in combination with an electronically controlled source of artificial illumination, in general, and to means for varying the size of the acceptance angle of the photodetector forming a part of said apparatus wherein scene light is measured both before and during an exposure interval, in particular.

Built-in light detecting devices which form an integral part of an automatic camera exposure control arrangement are well-known to those skilled in the photographic arts. Such light detecting devices generally consist of a photovoltaic or photoresistive-type photodetector associated with an optical system so that light from a preselected area of a scene to be photographed can be directed onto the photosensitive surface of the photodetector. An electrical output signal indicative of the intensity or the brightness of the various objects located in the preselected area of the scene is derived from the photodetector and is thereafter generally utilized to control the exposure delivered to the film in accordance with sensitometric characteristics of the film and the known performance characteristics of other elements which comprise the exposure control arrangement. The electrical output signal of such devices are normally used prior to actual exposure to, for example, automatically adjust the exposure settings of the camera or after an exposure cycle is initiated to terminate the cycle upon satisfaction of a predetermined exposure condition.

The preselected area of the scene depends upon the acceptance angle of the light detecting device, the acceptance angle meaning the solid angle of the cone of light received by the light detecting device. Thus, if light from a particular scene object is to have an influence on the magnitude of the output signal of the light detecting device, that object must be located within the device's acceptance angle, i.e., the object must be "seen" by the device. It is apparent, therefore that the acceptance angle of such light detecting devices can be used as a means for controlling what the exposure will be in the sense that it can be aimed at a certain area of the scene that is considered important in preference to another area of the scene which may not be considered quite as important.

The acceptance angle employed for a particular light detecting device depends on the kinds of scenes it will probably be used to measure and the type of lighting which is used to illuminate those scenes. Consider, for example, a horizontal landscape illuminated by sky light or sun light. With this type of scene and lighting conditions, it is generally desirable to have a light detecting device which looks generally downwardly to exclude the sky whose influence, if considered, would tend to cause the ground details to be underexposed because the light detecting device would incorrectly assume that the ground detail was being illuminated to the same light level as the light level being provided by sky light.

Photographic cameras having exposure control systems that include a scene light detecting device that can be selectively aimed in different angular directions to compensate for extremes in lighting conditions within a particular scene are presently available in the prior art. In, for example, U.S. Pat. No. 4,173,400 to F. Faramarzpour there is disclosed an automatic camera having both ambient and flash exposure control modes of operation that is provided with a scene light detecting device having a particular acceptance angle that, depending upon the camera exposure mode, is aimed in different angular directions. Aiming of the light detecting device is accomplished by an arrangement that is responsive to the insertion of an artificial light source into the camera body that causes the light sensitive device to be aimed at a point above the camera's horizontal axis. However, if a scene to be photographed should include a relatively intense, but extremely localized light source, such as lighted candles on a birthday cake, pre-aiming the light sensitive device for the purpose of precluding the light sensitive device from classifying a low light level scene as one of high light level, when one cannot accurately predict where such a light source might be located, would not be practicable. If an otherwise low light level scene were to be classified as one of high light level, underexposed film would be the result.

Misclassifying a low light level scene as a high light level scene in a proportional fill-flash type of exposure control system such as that described in U.S. Pat. No. 4,192,587 to A. LaRocque et al would be particularly harmful in that it would prevent such an exposure control system from producing a properly exposed film. In a proportional fill-flash type of exposure control system, a mixture of both ambient and artificial light is employed for film exposure. The exposure control system operates in a range of light intensities such that film exposure is due to a mixture of available natural light and artificial or strobe light whose proportion changes in accordance with the intensity of the natural available light. Obviously, if the light sensing device indicates more ambient light in the scene than is actually present, such as in the birthday candle example mentioned above, less artificial strobe light will be provided and therefore an underexposed film will result.

It is a primary object of the present invention, therefore, to provide scene light sensing apparatus for an exposure control system that will minimize the possibility of a relatively intense localized light source within a scene to be photographed causing an underexposed film.

Another object of the present invention is to provide apparatus for varying the acceptance angle of a photosensitive device for use in a photographic camera where the acceptance is changed in response to the actuation of a selected camera function.

A further object of the present invention is to provide apparatus for varying the acceptance angle of a photosensitive device for use in a photographic camera that will have no effect on scene light measurement during an exposure interval.

Other objects, features and advantages of the present invention will be readily apparent from the following detailed description of the preferred embodiment thereof, taken in conjunction with the accompanying drawings.

SUMMARY OF THE INVENTION

In accordance with the present invention there is provided an exposure control system for a photographic camera of the type that includes an electronically controlled source of artificial illumination and a photosensitive element for sensing scene light before and during an exposure interval that additionally includes means for minimizing the liklihood that a relatively bright but localized source of light included within the scene to be photographed might cause an underexposed film. The means for minimizing such underexposure includes apparatus for temporarily increasing the acceptance angle or field of view of the scene-light measuring photosensitive element whenever scene light levels are measured prior to the initiation of an exposure interval. Increasing acceptance angle size at this time will reduce the effect that a relatively bright light source would have on measured scene light if such a light source is capable of causing the photosensitive element to produce a false or artificially high indication of overall scene light and therefore a reduced amount of electronically controlled artificial illumination. The photosensitive element acceptance angle is subsequently reduced to its normal or smaller size to sense the amount of scene light present during an exposure interval for continued exposure control.

BRIEF DESCRIPTION OF THE DRAWINGS

FIG. 3a is a perspective view of a scene to be photographed showing the pre-exposure and exposure acceptance angles of the variable acceptance angle photodetector of the present invention.

FIG. 3b is an enlarged sectional view taken on the line 3b—3b in drawing FIG. 3a.

DESCRIPTION OF THE PREFERRED EMBODIMENTS

Figure 1:
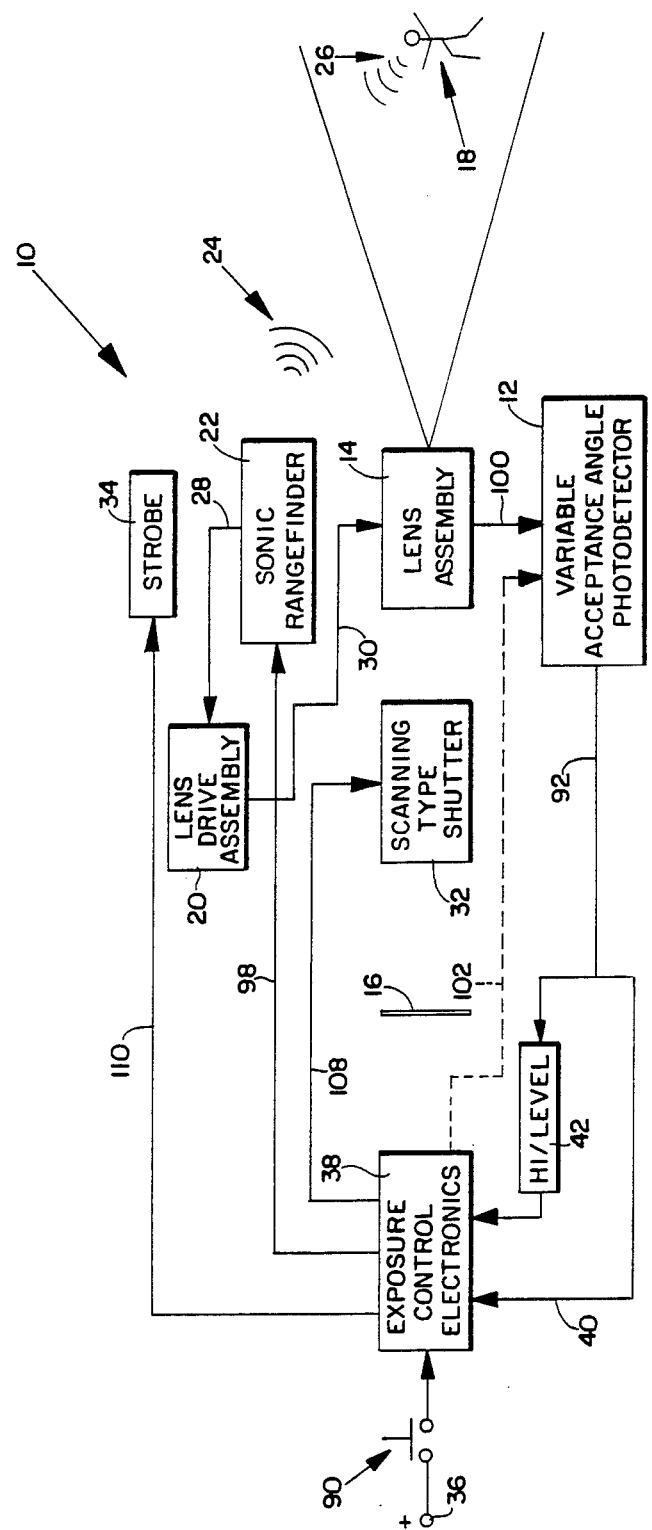
FIG. 1 is a functional block diagram of a photographic camera employing the variable acceptance angle photodetector of the present invention.

Turning now to the drawings, in FIG. 1 there is shown a functional block diagram of photographic camera 10 that incorporates variable acceptance angle photodetector 12 of the present invention. Camera 10 is preferably of the type that utilizes self-processing film such as that sold by Polaroid Corporation of Cambridge, Mass. under its registered trademark "Sun 660 Autofocus Camera". However, the present invention has application in cameras having an electronically source of artificial light and having an exposure control system that senses scene light both before and during an exposure interval.

Camera 10 includes an objective lens arrangement or assembly 14 disposed for movement between a plurality of different focal positions. During each film exposure operation, the objective lens assembly 14 is displaced to one of its focal positions for focusing image forming rays at focal plane 16 of a photographic subject as shown at 18 located within a given range of distances from the camera 10. Lens assembly 14 is driven through its plurality of different focal positions by lens drive 20 that includes a conventional electric motor (not shown) coupled to said lens assembly 14 through a conventional gear train (not shown). The movement of lens assembly 14 from its initial position toward its desired focus position operates to progressively focus image-forming rays for corresponding subjects located at progressively nearer distances to camera 10. This type of lens focusing is described in much greater detail in U.S. Pat. No. 4,199,244 to Shenk, now reissue U.S. Pat. No. 31,219.

Camera 10 is also provided with sonic rangefinder 22 which is more fully described in U.S. Pat. No. 4,199,246 to Muggli. Sonic rangefinder 22 includes a ranging circuit (not shown) that when actuated causes an ultrasonic transducer forming a part thereof (not shown) to transmit a burst of sonic energy 24 toward subject 18 for the purpose of determining the distance between said subject 18 and camera 10. The ultrasonic rangefinder operates to detect reflection 26 of said burst of ultrasonic energy from subject 18 at an elapsed time interval subsequent to the transmission of burst of sonic energy 24. A reflection or echo detection circuit (not shown) within rangefinder 22 provides a signal indicative of this elapsed time period which directly corresponds to the distance between camera 10 and subject 18. This subject distance signal is routed to lens drive assembly 20 through path 28 thereby causing lens coupled drive assembly 20 to adjust the focus of lens assembly 14 through path 30 in correspondence with the rangefinder 22 determined distance to subject 18.

Intermediate objective lens assembly 14 and focal plane 16 there is provided shutter mechanism 32 that is fully described in U.S. Pat. No. 3,942,183 entitled "Camera with Pivoting Blades" issued to G. Whiteside. The shutter mechanism 32 described therein includes a pair of overlapping shutter blade elements of the so-called scanning type that cooperatively move with respect to one another to form a scene light admitting aperture that controls the amount of image-containing scene light transmitted to focal plane 16. The aperture is selectively shaped to define a gradually varying aperture size that varies as a function of the relative position of said pair of overlapping blade elements. The time during which focused, image-containing light rays from lens assembly 14 are allowed to pass through the aperture formed by said pair of overlapping blade elements to form an image at focal plane 16 is referred to herein as an exposure interval.

Camera 10 is provided with an integral electronic flash or strobe shown schematically in FIG. 1 at 34. Strobe 34 charging and triggering may be of a type well known in the art as is more fully disclosed in U.S. Pat. No. 4,064,519 to R. Kee. Strobe 34 preferably derives charging power from a battery (not shown) connected to terminal 36 and contained within a film pack or cassette in a manner employed in Polaroid Corporation SX-70 film cassettes and cameras.

Additionally, camera 10 includes photodetector 12 and associated circuitry (not shown) to control exposure in accordance with scene illumination. Photodetector 12 is connected to exposure control electronics 38 that operates in a known manner to vary the exposure duration and/or the size of the aperture formed by scanning shutter 32 in response to the amount of scene light sensed by photodetector 12. An electrical output signal indicative of the intensity or the brightness of the various objects located within the acceptance angle of photodetector 12 is derived from said photodetector 12 and is thereafter utilized to control the exposure delivered to film located at focal plane 16. Scene light sensed by photodetector 12 is routed to exposure control electronics 38 through path 40 and through high level signal generator 42 if the magnitude of the scene light detected by photodetector 12 exceeds a predetermined magnitude. The acceptance angle of photodetector 12 is of a type that can be varied between at least two different angles to thereby enable the photodetector to selectively sense scene light within at least two different sized scene areas in a manner to be more fully described in the following paragraphs.

A photodetector normally includes a light sensitive element and an optical system that defines a fixed acceptance angle within which scene radiation can be collected. However, photodetector 12 of the present invention is of a type whose acceptance angle may be selectively varied to accommodate different scene-light conditions. FIGS. 2a, 2b, 2c and 2d schematically illustrates three different embodiments of variable acceptance angle photodetector 12 whereas FIG. 3a and 3b schematically illustrate two different size eliptical shaped areas 44 and 46 wherein scene light is sensed when the acceptance angle of photodetector 12 is changed from one particular acceptance angle to another. In addition, FIG. 3a depicts optical field of view 48 that represents the outer limit of a photographic scene at a particular distance from camera 10. Field of view 48 is rectangular in that both dimensions 50 and 52 correspond to an optical field of view of 40°.

Figure 2A:
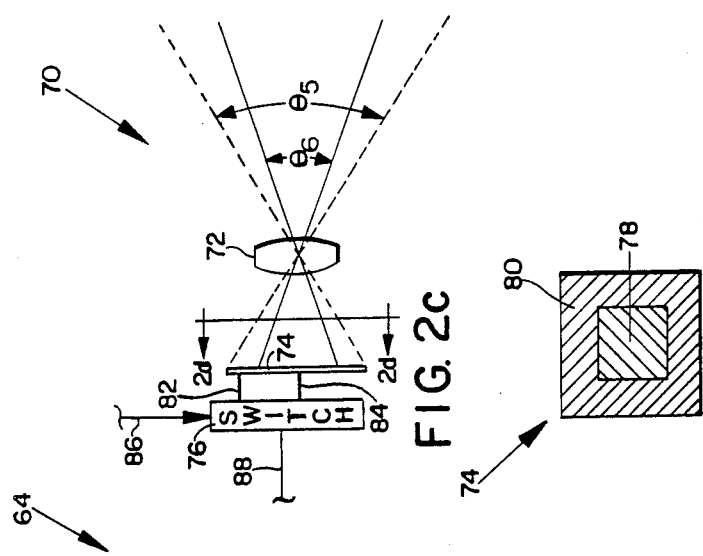
FIG. 2a is a schematic diagram of a photodetector that employs a movable diffuser to vary the size of the acceptance angle within which it is capable of detecting scene light.

Referring to FIG. 2a of the drawings, numeral 54 represents a preferred embodiment of photodetector 12 wherein said embodiment includes photosensitive element 56, lens 58 and movable diffuser 60. Photosensitive element 56 is of conventional design and generates an electrical signal representative of the level of radiant energy falling on its photosensitive surface. Lens 58 focuses light rays within a particular acceptance angle on said photosensitive surface and movable diffuser 60 changes the acceptance angle of lens 58 when it is moved into and out of the scene light level viewing optical path of lens 58. Diffuser 60 is of conventional design with one of its inherent functions being to scatter or spread out light rays from a particular source or direction falling on one of its optical surfaces. Another inherent function is to gather light rays from light sources within a conical angle that is greater than the acceptance angle formed by photosensitive element 56 in combination with lens 58. The scattering and gathering features of diffuser 60 tend to average scene light collected by its optical surface. Therefore, the error producing effect that a relatively bright localized light source might otherwise have on measured scene light levels is greatly diminished when diffuser 60 is moved into the optical path along which a photodetector measures scene light. When diffuser 60 is moved into the optical path of lens 58, shown in phantom in drawing FIG. 2a, the resultant acceptance angle of photodetector embodiment 54 is, in effect, the large angle represented by $\theta_1$. Conversely, when diffuser 60 is moved out of the optical path of lens 58 as shown in solid lines in FIG. 2a, the acceptance angle of photodetector embodiment 54 becomes the smaller angle represented by $\theta_2$.

Figure 2B:
FIG. 2b is a schematic diagram of a photodetector that employs an adjustable focus lens to vary the size of the acceptance angle within which it is capable of detecting scene light.

Similarly, and with respect to FIG. 2b of the drawings, numeral 64 represents an alternate embodiment of variable acceptance angle photodetector 12. With reference to FIG. 2b, alternate photodetector embodiment 64 includes multiple element (not shown) adjustable focus lens 66 and photosensitive element 68. Photosensitive element 68 is also of conventional design and generates electrical signal in the same manner as photosensitive element 56 shown in drawing FIG. 2a. Adjustable force lens 66 focuses light rays within two different acceptance angles on the photosensitive surface of photosenstive element 68 when adjusted to one of the two focus positions shown in drawing FIG. 2b. It should be understood that when composite lens 66 is adjusted to the solid or phantom line focus positions shown in drawing FIG. 2b, lens 16 must be re-focused by moving one or more of the lens elements (not shown) within lens 66. When lens 66 is adjusted to the focus position shown in phantom in FIG. 2b, adjacent photosensitive element 68, the acceptance angle of alternate photodetector embodiment 64 is the large angle represented by $\theta_3$. However, when lens 66 is adjusted to the position shown in solid lines, remote from photosensitive element 68, the acceptance angle of alternate photodetector embodiment 64 becomes the small angle represented by $\theta_4$. Lens 66 is conventionally mounted and is readily adjusted between the focus positions shown in FIG. 2b when coupled to conventional lens focusing or drive means. When lens 66 is adjusted to a focus position immediately adjacent photosensitive element 68 or the position shown in phantom in FIG. 2b, the effect is similar to that in preferred photodetector embodiment 54 in FIG. 2a when diffuser 60 is placed in the optical path of lens 58 in that scene light within acceptance angle $\theta_3$ sensed by photosensitive element 68 tends to be average. Therefore, like embodiment 54 in FIG. 2a, photodetector embodiment 64 in FIG. 2b will also greatly diminish the error-producing effect that a bright but localized light source might otherwise have on establishing overall scene light levels when the acceptance angle of photodetector embodiment 64 is adjusted to equal $\theta_3$.

Figure 2C:
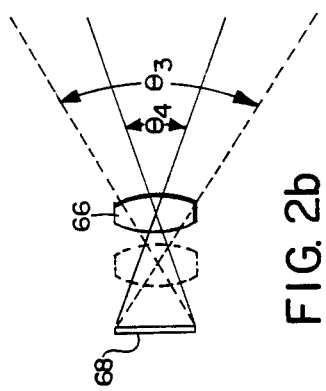
FIG. 2c is a schematic diagram of a photodetector that employs a segmented light sensitive surface to vary the size of the acceptance angle within which it is capable of detecting scene light.
Figure 2D:
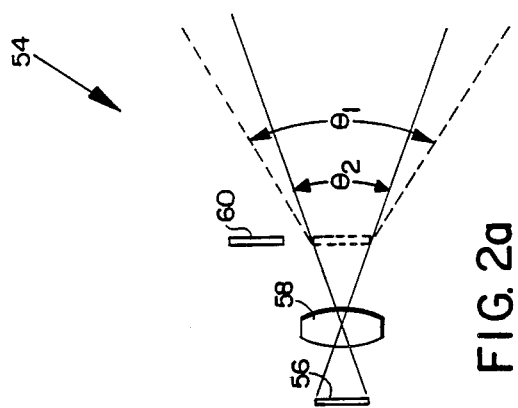
FIG. 2d is a sectional view taken on the line 2d-2d in drawing FIG. 2c.

Another embodiment of the variable acceptance angle photodetector 12, referred to herein by numeral 70, is shown in drawing FIG. 2c. In FIG. 2c, alternate embodiment 70 includes lens 72 mounted in a fixed position, segmented photosensitive element 74 and switch module 76 electrically coupled to said photosensitive element 74. Photosensitive element 74 is segmented into electrically isolated parts 78 and 80 as best shown in drawing FIG. 2d, said FIG. 2d being a view of photosensitive element 74 taken on the line 2d-2d in drawing FIG. 2c. Segments 78 and 80 of photosensitive element 74 function in the same general manner as, for example, respective photosensitive elements 56 and 58 in drawing FIGS. 2a and 2b. Each segment of photosensitive element 74 is connected to switch module 76 through paths 82 or 84. Signals applied to switch module 76 through path 86 will cause an electrical signal representative of scene light levels generated by photosensitive element segment 78 or segments 78 and 80 to appear at switch module output 88. In one mode of operation, only the output of segment 78 is connected to output 88 whereas in another mode of operation, the collective outputs of segments 78 and 80 are connected to said switch module output 88. When the electrical output of segment 78 is connected to switch module output 88, the size of photosensitive element 74 is relatively small. However, when the electrical outputs of both segments 78 and 80 are connected to switch module ouput 88, there is a substantial increase in the size of photosensitive element 74 with the so-combined photosensitive segments acting as if they were a single but larger photosensitive element. When the outputs of both segments 78 and 80 of photosensitive element 74 are connected to switch module output 88, the acceptance angle of photodetector embodiment 70 is the large angle represented by $\theta_5$. However, when only the output of segment 78 is connected to output 88 of switch module 76, the acceptance angle of photodetector embodiment 70 becomes the smaller angle represented by $\theta_6$ because segment 80 would have been rendered insensitive to any light falling on its photosensitive surface.

OPERATION

Referring now to FIGS. 1, 2a–2d, 3a and 3b of the drawings, camera 10 incorporating variable acceptance angle 12 operates in the following manner to produce a typical film exposure cycle. Switch 90 is manually actuated to its closed position thereby applying a sequence initiating voltage to the input of exposure control electronics 38. Upon receipt of a sequence initiating voltage from switch 90, exposure control electronics 38 samples the light level sensed by variable acceptance angle photodetector 12 through path 92. A signal representative of the light level sensed by photodetector 12 and routed through path 92 is then stored within exposure control electronics 38. The photodetector 12 may take the form of any of the photodetector embodiments described above in FIGS. 2a–2c. However, as noted above, the embodiment of FIG. 2a is prefered. Prior to the actuation of switch 90, it is to be assumed that the acceptance angle of the photodetector embodiment employed is in its wide angle position or the acceptance angle represented by $\theta_1$, $\theta_3$ or $\theta_5$ in respective drawing FIGS. 2a, 2b or 2c. When photodetector embodiments 54, 64 or 70 are in their wide acceptance angle positions respectively represented by angles $\theta_1$, $\theta_3$, or $\theta_5$, said photodetectors sense scene light within generally elliptical area 44 of optical field of view 48 as shown in drawing FIG. 3a. The vertical and horizontal angles subtended by the photodetector when in this wide angle position are approximately 20° and 40°, respectively, with numerals 94 and 96 in FIG. 3b respectively representing said vertical and horizontal angles.

Upon receipt of the sequence initiating voltage from switch 90, exposure control electronics 38 also activates sonic rangefinder 22 through path 98 thereby causing said rangefinder 22 to transmit burst of sonic energy 24 toward subject 18. The time of receipt of echo or reflection 26 from subject 18 by rangefinder 22 establishes the distance to said subject 18. A subject distance signal representative of the distance to subject 18 is routed from rangefinder 22 to lens drive assembly 20 to thereby cause lens assembly 14 coupled thereto to focus an image of subject 18 at focal plane 16 after a light admitting aperture has been formed by scanning shutter 32. The movement or actuation of lens assembly 14 to such a focus position causes the photodetector acceptance angle to be changed from its initial wide angle position to the smaller angle position employed during an exposure interval in one of the following ways.

If the embodiment of photodetector 12 is that of either embodiment 54 in drawing FIG. 2a or embodiment 64 in drawing FIG. 2b, the photodetector acceptance angle is changed by coupling the movement of lens assembly 14 to diffuser 60 (FIG. 2a) or to lens 66 (FIG. 2b) through path 100 (FIG. 1), depending upon the embodiment employed. However, if embodiment 70 in FIG. 2c is employed, the photodetector acceptance angle is changed to its smaller acceptance angle by a switch 76 actuating signal from exposure control electronics 38 routed through path 102 (FIG. 1) and then through path 86 in photodetector embodiment 70 shown in drawing FIG. 2c. The signal on path 102 from exposure control electronics 38 to variable acceptance angle photodetector 12 is initiated by conventional control circuitry (not shown) within an exposure control electronics 38 after a signal representative of the scene light level generated by photodetector 12 has been received by said exposure control electronics 38 and before the start of an exposure interval. When photodetector embodiments 54, 64 or 70 are in their narrow acceptance angle positions represented by angles $\theta_2$, $\theta_4$, or $\theta_6$, respectively, shown in respective drawing FIGS. 2a, 2b, and 2c, said photodetectors sense scene light within generally elliptical area 46 of optical field of view 48 as shown in drawing FIG. 3a. The vertical and horizontal angles subtended by the photodetector when in this narrow or smaller angle position are approximately 10° and 20°, respectively, with numerals 104 and 106 in FIG. 3b respectively representing said vertical and horizontal angles. After lens assembly 14 has focused an image of subject 18 at focal plane 16 and varible acceptance angle photodetector 12 has been adjusted to its narrow or smaller angle position, as described above, exposure control electronics 38 actuates scanning shutter 32 through path 108 to initiate an exposure interval and triggers strobe 34 through path 110 at a point in time during said exposure interval primarily determined by the level of scene light sensed by photodetector 12 as more fully described in the above-mentioned Larocque et al patent. Scene light levels high enough to trigger high scene light level generator 42 would inhibit the triggering of strobe 34 and therfore illumination of subject 18 under such conditions would be entirely dependent upon ambient or otherwise available light.

It should be understood that when the term "acceptance angle" is employed herein as a means of describing the area of a scene where light is to be sensed by the photodetector, it refers either to a single conical angle when the conical space "viewed" by the photodetector is of circular cross-section or to a combination of conical angles when the conical space "viewed" by the photodetector is of non-circular cross-section.

It will be apparent to those skilled in the art from the foregoing description of my invention that various improvements and modifications can be made in it without departing from its true scope. The embodiments described herein are merely illustrative and should not be viewed as the only embodiments that might encompass my invention.

What is claimed is:

1. In an exposure control system for a camera having an adjustable focus objective lens and adapted to control the amount of light from a scene incident upon photosensitive film during exposure sequences, the improvement comprising:

means for evaluating scene light including a photodetector system having an acceptance angle, a photosensitive surface for providing an electrical output signal that varies in accordance with the amount of radiant energy incident on said photosensitive surface and an optical system for collecting scene light within a particular acceptance angle and for directing said collected light onto said photosensitive surface;

means for adjusting said photodetector system between a first arrangement and a second arrangement wherein its said acceptance angle differs from that in its said first arrangement including a diffuser movably mounted between a first position where it increases the size of said acceptance angle and a second position where it does not change the size of said acceptance angle and means coupling said objective lens to said diffuser for moving said diffuser between its said first and second positions in response to objective lens focusing movement to thereby change the acceptance angle of said photodetector system;

means for making a pre-exposure evaluation of scene light utilizing said diffuser in its said first position and for then subsequently making an evaluation of scene light while the photosensitive film is being exposed to scene light utilizing said diffuser in its said second position and producing a control signal responsive thereto; and means responsive to said pre-exposure evaluation of scene light for providing either for selecting one of a plurality of alternately available operational exposure parameters during an exposure sequence of said camera and further responsive to said control signal for terminating the exposure of the photosensitive film to scene light.

2. In an exposure control system for a camera having an adjustable focus objective lens and adapted to control the amount of light from a scene incident upon photosensitive film during exposure sequences in both high ambient and low ambient scene light conditions, the improvement comprising:

means for evaluating scene light including a photodetector system having an acceptance angle, a photosensitive surface for providing an electrical output signal that varies in accordance with the amount of radiant energy incident on said photosensitive surface and an optical system for collecting scene light within a particular acceptance angle and for directing said collected light onto said photosensitive surface, said optical system including a lens movably mounted between a first position where it establishes a first photodetector acceptance angle and a second position where it establishes a second photodetector acceptance angle;

means for adjusting said photodetector system between a first arrangement wherein its said acceptance angle is substantially less than that of the camera's objective lens and a second arrangement wherein its said acceptance angle is significantly larger than that in its said first arrangement including means coupling said objective lens to said photodetector lens for moving said photodetector lens between its said first and second positions in response to objective lens focusing movement to thereby change the acceptance angle of said photodetector system;

means for making a pre-exposure evaluation of scene light utilizing said photodetector system in its said second arrangement, said second arrangement of said photodetector system serving to reduce the contribution of light from a small bright source during said pre-exposure evaluation, and producing a first output signal in response to a low level of scene light and a second output signal in response to a high level of scene light, and for then subsequently making an evaluation of scene light while the photosensitive film is being exposed to scene light utilizing said photodetector system in its said first arrangement and producing a control signal responsive thereto; and means responsive to the presence of either said first or second output signals during said pre-exposure evaluation of scene light for respectively providing either a first or second selection of operational exposure parameters during an exposure sequence of said camera and further responsive to said control signal for terminating the exposure of the photosensitive film to scene light.

3. In an exposure control system for a camera having an adjustable focus objective lens and adapted to control the amount of light from a scene incident upon photosensitive film during exposure sequences in both high ambient and low ambient scene light conditions, the improvement comprising:

means for evaluating scene light including a photodetector system having an acceptance angle, a photosensitive surface for providing an electrical output signal that varies in accordance with the amount of radiant energy incident on said photosensitive surface and an optical system for collecting scene light within a particular acceptance angle and for directing said collected light onto said photosensitive surface;

means for adjusting said photodetector system between a first arrangement wherein its said acceptance angle is substantially less than that of the camera's objective lens and a second arrangement wherein its said acceptance angle is significantly larger than that in its said first arrangement including a diffuser movably mounted between a first position where it increases the size of said acceptance angle and a second position where it does not change the size of said acceptance angle and means coupling said objective lens to said diffuser for moving said diffuser between its said first and second positions in response to objective lens focusing movement to thereby change the acceptance angle of said photodetector system;

means for making a pre-exposure evaluation of scene light utilizing said photodetector system in its said second arrangement, said second arrangement of said photodetector system serving to reduce the contribution of light from a small bright source during said pre-exposure evaluation, and producing a first output signal in response to a low level of scene light and a second output signal in response to a high level of scene light, and for then subsequently making an evaluation of scene light while the photosensitive film is being exposed to scene light utilizing said photodetector system in its said first arrangement and producing a control signal responsive thereto; and means responsive to the presence of either said first or second output signals during said pre-exposure evaluation of scene light for respectively providing either a first or second selection of operational exposure parameters during an exposure sequence of said camera and further responsive to said control signal for terminating the exposure of the photosensitive film to scene light.

4. In an exposure control system for a camera having and adjustable focus objective lens and adapted to control the amount of light from a scene incident upon photosensitive film during exposure sequences, the improvement comprising:

means for evaluating scene light including a photodetector system having an acceptance angle, a photosensitive surface for providing an electrical output signal that varies in accordance with the amount of radiant energy incident on said photosensitive surface and an optical system for collecting scene light within a particular acceptance angle and for directing said collected light onto said photosensitive surface, said optical system including a lens movably mounted between a first position where it establishes a first photodetector acceptance angle and a second position where it establishes a second photodetector acceptance angle;

means for making a pre-exposure evaluation of scene light utilizing said photodetector system in its said first position and for then subsequently making an evaluation of scene light while the photosensitive film is being exposed to scene light utilizing said photodetector system in its said second position and producing a control signal responsive thereto;

means responsive to said pre-exposure evaluation of scene light for providing either for selecting one of a plurality of alternately available operational exposure parameters during an exposure sequence of said camera and further responsive to said control signal for terminating the exposure of the photosensitive film to scene light; and means coupling said objective lens to said photodetector lens for moving said photodetector lens between its said first and second positions in response to objective lens focusing movement to thereby change the acceptance angle of said photodetector system.

* * * * *